US005564839A

United States Patent [19]
Ouchi et al.

[11] Patent Number: 5,564,839
[45] Date of Patent: Oct. 15, 1996

[54] BEARING UNIT FOR WHEEL WITH SPEED SENSOR

[75] Inventors: Hideo Ouchi, Sagamihara; Junshi Sakamoto, Yokohama, both of Japan

[73] Assignee: NSK Ltd., Tokyo, Japan

[21] Appl. No.: 596,982

[22] Filed: Feb. 5, 1996

Related U.S. Application Data

[63] Continuation of Ser. No. 144,670, Oct. 27, 1993, abandoned.

[30] Foreign Application Priority Data

Oct. 29, 1992 [JP] Japan .................. 4-080611 U
Dec. 25, 1992 [JP] Japan .................. 4-092698 U

[51] Int. Cl.$^6$ .................................. F16C 19/28
[52] U.S. Cl. ........................... 384/448; 384/446
[58] Field of Search .................... 384/448, 906, 384/446, 482, 484

[56] References Cited

U.S. PATENT DOCUMENTS 4,946,296  8/1990  Olschewski et al. .
5,207,512  5/1993  Grant et al. ................... 384/906

FOREIGN PATENT DOCUMENTS 49-1743    1/1974   Japan .
49-37719  10/1974   Japan .
50-20209   7/1975   Japan .
50-37484  10/1975   Japan .
57-61220  12/1982   Japan .
3718131    8/1991   Japan .

Primary Examiner—Lenard A. Footland
Attorney, Agent, or Firm—Helfgott & Karas, P.C.

[57] ABSTRACT

The bearing unit with speed sensor of this invention comprises a shaft, inner rings or races which have inner ring raceways formed around its outer circumferential surfaces and which are secured around the shaft, a member that serves as an outer ring or race having outer ring raceways formed in its inner circumferential surface, several rolling bodies that are located between the inner ring raceways and outer ring raceways, the shaft is stationary during operation with the member turning, a tone wheel fastened to the member which turns during operation, a sensor which is supported by the shaft to face the tone wheel, a non-rotating member which is connected to the shaft, and an engaging means for securing connecting shaft to the non-rotating member so as to prevent the sensor from turning in use for long periods of time.

9 Claims, 18 Drawing Sheets

BEARING UNIT FOR WHEEL WITH SPEED SENSOR

This is a continuation of application Ser. No. 08/144,670, filed Oct. 27, 1993, abandoned.

BACKGROUND OF THE INVENTION

1. Field of the Invention

The present invention is related to a bearing unit for wheel with speed sensor which supports an automobile wheel so that the wheel rotates freely with respect to the suspension device, and detects the rotation speed (rpm) of the wheel.

2. Description of the Prior Art

A rolling-bearing unit with a speed sensor, such as that disclosed in U.S. Pat. No. 4,968,156, has previously been known in which the rolling-bearing unit supports an automobile wheel so that the wheel rotates freely with respect to the suspension device, and which detects the rotation speed of the wheel in order to control the the anti-lock brake system (ABS) or traction control system.

The rolling-bearing unit with speed sensor disclosed in the above patent is constructed as shown in FIGS. 1 and 2. A pair of inner rings or races 2 which are coupled together by a coupling ring, are fitted around the wheel axle 3. Both of the inner rings or races 2 are held and secured between a holder 4 and nut 5. An inner ring raceway 6 is formed around the outer surface of each of the inner rings or races 2.

Also, a double row of outer ring raceways 8 are formed in the inner circumferential surface of a hub 7 which functions as the outer ring or race. Several balls 9 are located between each of the outer ring raceway 8 and the inner ring raceway 6, so that the hub 7 is freely rotatably supported around the wheel axle 3. The wheel 10 is attached to a flange 11 formed on the outer circumferential surface of the hub 7.

Furthermore, there is a seal ring 12 comprising a seal material 16 and a core metal ring 13 which is fitted into and fastened to the opening on the axially inside end of the hub 7 (the axially inside end is the end on the right in FIG. 1 which faces toward the widthwise center of the vehicle when installed). Also, a tone wheel 14 is fastened to this core metal ring 13. This tone wheel 14 is made up of permanent magnets and is arranged so that the S-poles and N-poles alternate around the circumference.

There is a support ring 15 that is fitted around and fastened to the axially inside end of the axially inside one of the pair of inner rings or races 2. The edge of the seal material 16 is formed so that it comes in contact with the inner circumferential surface and axially outside surface of this support ring 15, so that it prevents dust and rain water from getting into the area where the balls 9 are located. Also, there is a sensor 17 supported by part of the support ring 15, and the detection section of this sensor 17 faces the axially inside surface of the tone wheel 14 through an opening in the support ring 15.

In the rolling-bearing unit with speed sensor described above, the wheel 10, which is fastened to the hub 7, can be supported so that it turns freely with respect to the wheel axle 3 around which the inner rings or races 2 are supported. Moreover, the sensor 17 faces the axially inside surface of the tone wheel 14 fastened to the hub 7, and when the hub 7 turns together with the wheel 10, the output of the sensor 17 changes. The frequency at which the output from the sensor 17 changes is proportional to the rpm of the wheel, and if the signal output from the sensor 17 is input to a controller (not shown in the figure), it is possible to find the rpm of the wheel and adequately control the anti-lock brake system (ABS) and traction control system (TCS).

In the rolling-bearing unit with speed sensor of this invention, by completely preventing the sensor 17 to turn around the wheel axle 3, it is possible to prevent failures that occur when the lead wire 18 used for fetching the output signal from the sensor 17 is cut.

In the construction shown in FIG. 1, rotation of the inner rings or races 2 around the wheel axle 3 is prevented by the friction force that occurs between the inner circumferential surface of the inner rings or races 2 and the outer circumferential surface of the wheel axle 3, and by the friction force that occurs between the axial ends of the inner rings or races 2 and axially outside surface of the holder 4 and axially inside surface of the nut 5. If the rolling-bearing unit is used for long periods of time, however, the friction forces mentioned above gradually decrease and the inner rings or races 2 are caused to circumferentially move or turn around the wheel axle 3 by the rolling friction occurring between the inner ring raceways 6 and the balls 9, which is so called as "creep".

In normal rolling-bearing units which is not equipped with such a speed sensor, there is no real problem even if the creep occurs. However, if the creep occurs in a rolling-bearing unit with speed sensor, the support ring 15 and sensor 17 also turn around the wheel axle 3 together with the inner ring or race 2, and the lead wire 18 attached to the sensor 17 is pulled very hard. There is also a strong possibility that the lead wire 18 will get wound around the hub 7 and be cut.

If the lead wire 18 is cut, it is no longer possible to detect the rpm of the wheel, and thus it is not possible to control the anti-lock brake system and traction control system. Of course, it is possible to prevent the inner rings or races 2 from turning due to the rolling friction if the nut 5 is extremely tightened. However this is not always possible because the tightening force of the nut 5 could not be increased due to the preload pressure on the balls 9, and the nut 5 itself may become loose if used for long periods of time. Therefore, it is difficult to expect that this will effectively stop the inner rings or races 2 from turning.

It is also possible to consider using a spline joint or key joint between the inner circumferential surface of the inner ring or race 2, which supports the sensor 17, and the outer circumferential surface of the wheel axle 3, to make relative rotation impossible. However it is not too desirable because the work involved in forming a spline groove or key groove is very troublesome causing the manufacturing costs to be increased.

FIG. 3 shows construction as disclosed in U.S. Pat. No. 4,946,296, where the sensor 17 is prevented from turning around the wheel axle (omitted from FIG. 3, but see the wheel axle 3 of FIG. 1).

A knuckle spindle 119 is formed at the end portion of the wheel axle onto which the inner ring or race 2 is fitted. The knuckle spindle 119 is formd with a recessed section 119a at a portion on its outer circumferential surface, while the support ring 15 with the sensor thereon has a main body fitted onto the inner ring or race 2 and a projected section 15a on its inner circumferential surface. The projected section 15a is engaged with the recessed section 119a so as to prevent the support ring 15 from rotating with respect to the wheel axle 3.

In the construction as mentioned above, the sensor 17 is not rotated around the wheel axle 3, and threfore the lead wire 18 attached to the sensor is not cut. However, the inner ring or race 2 is not tailored to be relatively stationary with respect to the wheel axle 3, resulting in that the sensor 17 is not completely supported with respect to the wheel axle 3. Once the inner ring or race 2 is placed under a creep state with respect to the wheel axle 3, the recessed section 119a is inclined to be easily disengaged from the projected section 15a, and in addition, the sensor 17 is subject to vibrations, resulting in that the wheel rotation speed could not be precisely detected.

The rolling-bearing unit with speed sensor of this invention takes these circumstances into consideration.

SUMMARY OF THE INVENTION

The bearing unit with speed sensor of this invention comprises a first member that serves as a shaft, inner rings or races which have inner ring raceways formed around its outer circumferential surfaces and which are secured around the first shaft member, a second member that serves as an outer ring or race having outer ring raceways formed in its inner circumferential surface, several rolling bodies that are located between the inner ring raceways and outer ring raceways, one of the first and second members is stationary during operation with the other turning, a tone wheel fastened to the member which turns during operation, a sensor which is supported by the member which is stationary during operation to face the tone wheel, a non-rotating member which is connected to the member which is stationary during operation, and an engaging means for securely connecting the stationary member to the non-rotating member so as to prevent the sensor from turning in use for long periods of time.

DESCRIPTION OF THE PREFERRED EMBODIMENTS

Figure 1:
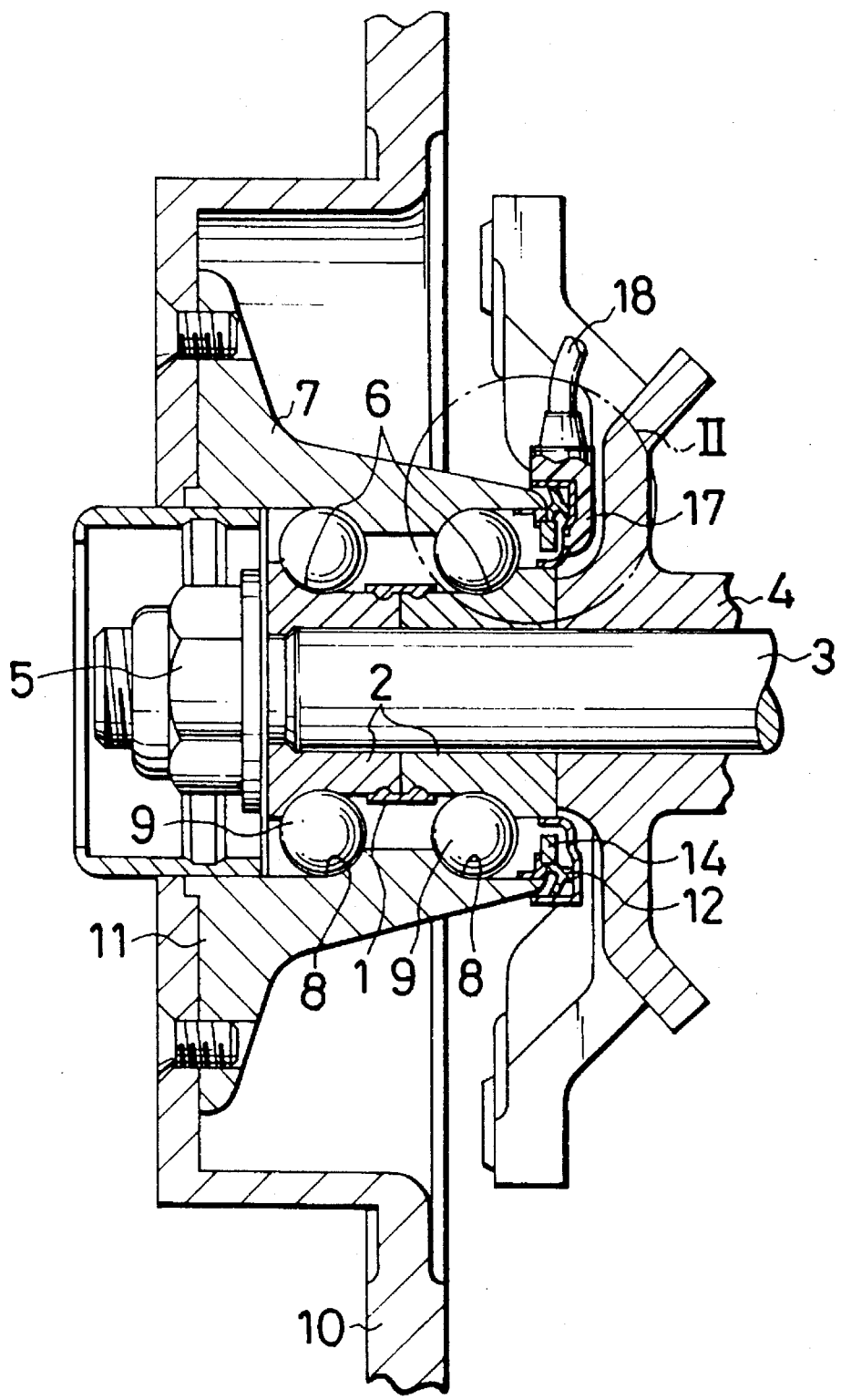
FIG. 1 is a cross-sectional view of a conventional ball-bearing unit with rpm detector.
Figure 2:
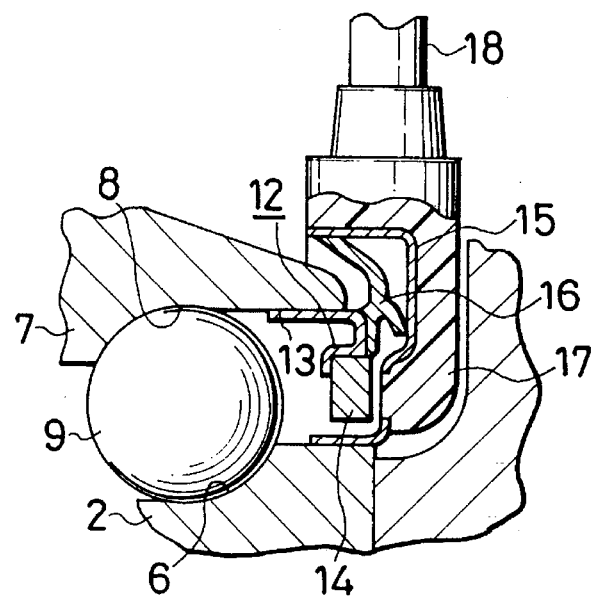
FIG. 2 is an enlarged view of section II of FIG. 1.
Figure 3:
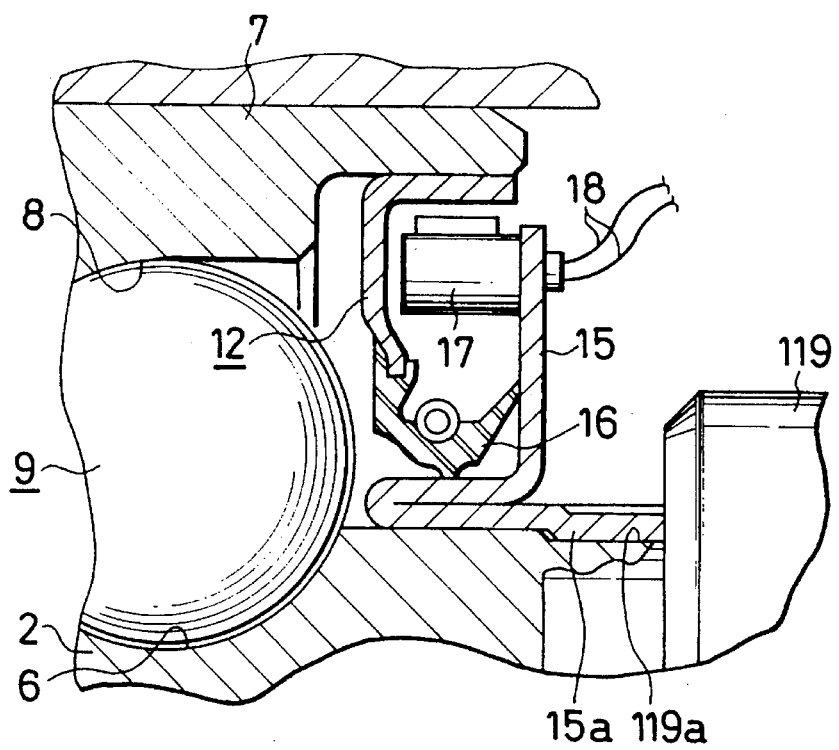
FIG. 3 is a cross-sectional view of part of a conventional ball bearing unit.

The bearing unit with speed sensor in a first feature of this invention comprises a shaft member which does not turn during operation, inner rings or races which have inner ring raceways formed around the outer circumferential surfaces and which are secured around the shaft member, a member that serves as an outer ring or race having outer ring raceways formed in its inner circumferential surface and which turns during operation, several rolling bodies that are located between the inner ring raceways and outer ring raceways, a tone wheel fastened to the member serving as the outer race, a sensor which is supported by the inner ring or race to face the tone wheel, and a non-rotating member which supports a pin that runs in the axial direction through the axially inside end of the inner ring or race and through the axially outside end of the non-rotating member, so that this pin prevents the inner races from rotating with reference to the non-rotating member.

The rolling-bearing unit with speed sensor constructed as described above, not only supports the wheel so that it turns freely around the wheel axle, but it is also capable of detecting the rpm of the wheel fastened to the member serving as the outer race in the same way as the conventional rolling-bearing unit with speed sensor.

In the bearing unit with speed sensor of this feature, by placing the pin between the inner ring or race and the non-rotating member, the inner ring or race is prevented from turning, and even if used for long periods of time, the inner ring or race is still prevented from turning. Also, the sensor supported by the inner ring or race does not turn and so the lead wire attached to the sensor is prevented from being cut.

In another feature of this invention, the shaft member is formed with a recessed section on its outer circumferential surface while the inner ring or race is formed with a projected section on its inner circumferential surface, or the shaft member is formed with a projected section on its outer circumferential surface while the inner ring or race is formed with a recessed section on its inner circumferential surface, so that the projected section is engaged with the recessed section as the shaft member is fitted into the inner ring or race. The recessed section and the projected section can be made e.g. in a spline type. In another way, at least one portion of the circumferential surfaces of the recessed section and the projected section can be made eccentric with reference to the cylindrical surface having the same center axis as those of the shaft member and the inner ring or race, providing engagement between the the recessed section and the projected section so as to prevent the inner ring or race from rotating around the shaft member.

In the second feature of the present invention, due to the engagement between the recessed section and the projected section, each formed either on the outer circumferential surface of the shaft member or on the inner circumferential surface of the inner ring or race, the inner ring or race is securely prevented from rotating even in the long term of use. Accordingly, the sensor supported by the inner ring or race is prevented from rotating and from substantially vibrating, and preventing the lead wire attached to the sensor from being cut, so that the situation that the rotational speed can not be detected is positively avoided.

Further, both of the shaft member and inner ring or race can be formed with a recessed section, and a key member is inserted into the recessed sections mated with each other.

In another way, the shaft member is kept plane, and the inner ring or race is formed with a recessed section for placing a key member.

If the bearing unit with speed sensor as in this invention is constructed and used as described above, the sensor can be prevented from carelessly rotating, thereby securely preventing the lead wire attached to the sensor from being cut, and thus it is possible to improve the reliability of the speed sensor.

Figure 4:
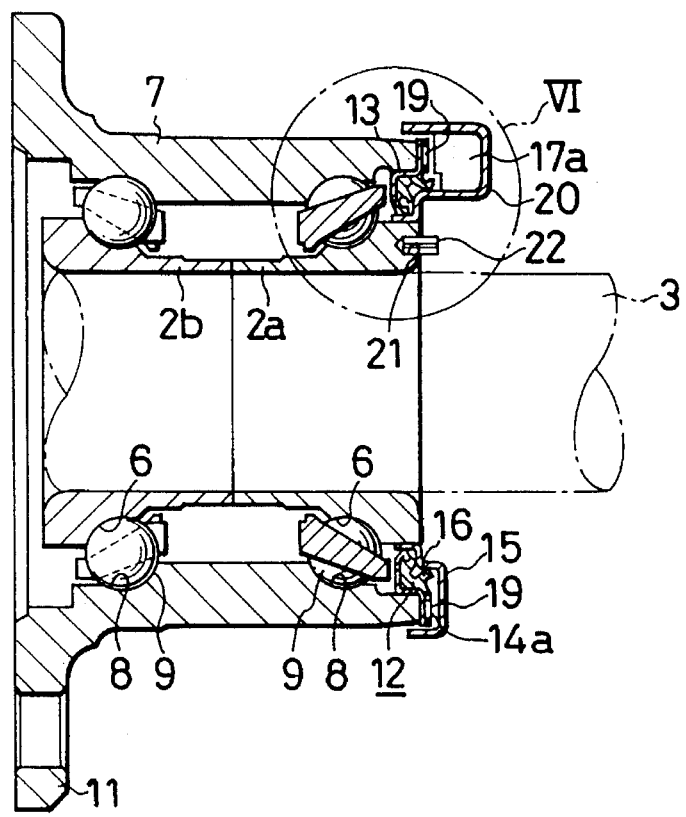
FIG. 4 is a cross sectional view showing a first embodiment of this invention, taken along the line IV—IV of FIG. 5.
Figure 5:
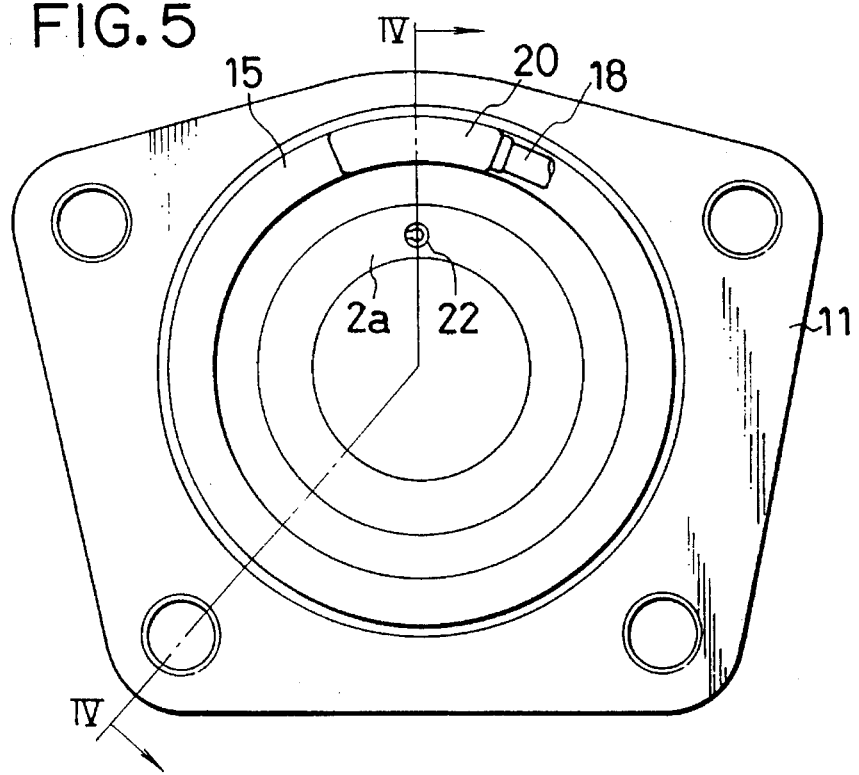
FIG. 5 is a right-side elevational view of FIG. 4.
Figure 6:
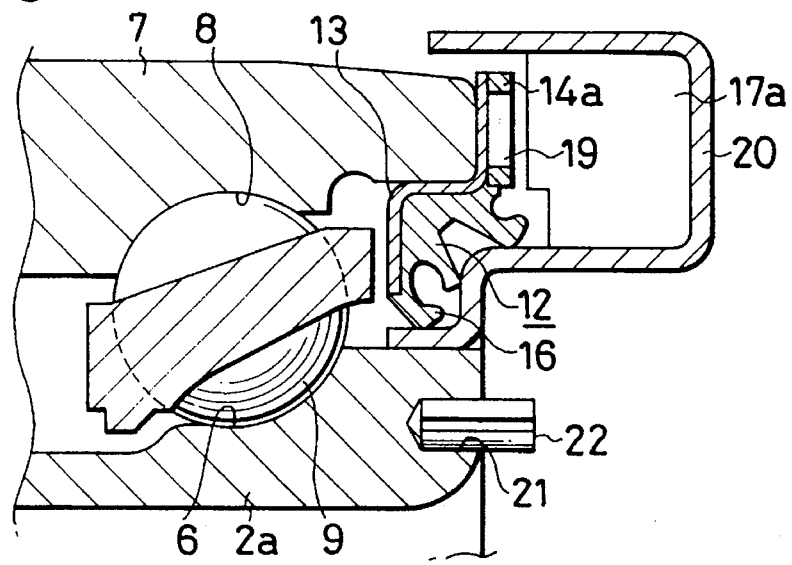
FIG. 6 is an enlarged cross sectional view of Section VI of FIG. 4.

FIGS. 4 to 6 show a first embodiment of this invention. Like the construction of the conventional rolling-bearing unit with speed sensor, a hub 7, which functions as the outer ring or race, is located concentrically around a pair of inner rings or races 2a and 2b each with an inner ring raceway 6 formed around its outer circumferential surface. Also, there are several balls 9 located between a double row of outer ring raceways 8 formed in the inner circumferential surface of the hub 7, and the inner ring raceways 6, respectively, and the hub 7 is supported so that it can turn freely around the inner rings or races 2a and 2b.

There is a flange 11 formed on the outer circumferential surface of the hub 7, and the wheel 10 (see FIG. 1) is fastened to the flange 11. Also, there is a seal ring 12 comprising a core metal ring 13 which is fastened inside the opening of the axially inside end of the hub 7. Moreover, there is a tone wheel 14a attached to the axially inside surface of this core metal ring 13. This tone wheel 14a is made entirely of magnetic material that is formed into an annular shape, and therefore by forming several through-holes 19 having equal pitch around its circumference, the magnetic properties alternate around the circumference.

There is a support ring 15, formed by drawing from a metal plate, that is fastened in a fitting relationship onto the axially inside end of the axially inside one 2a of the pair of inner rings or races 2a and 2b. The seal ring 12 is provided with a seal material 16 so that the edge of the seal material 16 comes in contact with the outer circumferential surface and axially outside surface of this support ring 15, whereby it prevents dust and rain water from getting into the area where the balls 9 are located. Moreover, there is a support section 20 formed in a portion of the support ring 15 by deeply drawing the metal plate. A sensor 17a is supported in this support section 20, and the detection section of this sensor 17a faces the axially inside surface of the tone wheel 14a. The lead wire 18 is used to fetch the detection signal from the sensor 17a and extended from one circumferential end of the support section 20, as shown in FIG. 5.

Also, there is a recessed section, specifically hole 21 formed in the surface of the axially inside end of the axially inside inner ring or race 2, and the axially outside half of a pin 22 is pressed into this hole 21. This pin 22 has a slit which runs along the length of the pin and allows the outer diameter of the pin 22 to contract elastically, thus being called a spring pin. The axially inside half of this pin 22 protrudes from the axially inside end of the inner ring or race 2 when the other half (axially outside half) is pressed into the hole 21.

Furthermore, there is a receiving hole (not shown in the figures) formed in the axially outside surface of the non-rotaing member opposite to the axially inside end of the axially inside inner ring or race 2a. The non-rotating member is for example, the holder 4 (see FIG. 1), or a knuckle (not shown). The axially inside half of the pin 22 can thus be inserted into the receiving hole when installing the bearing unit with speed sensor of this invention in the vehicle.

When the bearing unit with speed sensor described above is in use, the inner rings or races 2a and 2b are supported in a fitting relationship around the wheel axle 3 (illustrated by phantom lines), and the wheel 10 (not shown in FIG. 4) is fastened to the flange 11 formed on the outer circumferential surface of the hub 7. In this condition, the wheel 10 is supported so that it is able to turn freely with respect to the wheel axle 3. At the same time, the axially inside half of the pin 22 is inserted into the receiving hole in the holder 4 (FIG. 1). As a result, the holder 4 is coupled with the inner ring or race 2a which supports the sensor 17a by way of the support ring 15, so that relative rotation between the inner ring or race 2a and the holder 4 is impossible.

In the case where the bearing unit with speed sensor of this embodiment is installed between the wheel axle 3 and the wheel 10, and as the hub 7 rotates with the rotation of the wheel 10, the voltage output from the sensor 17a, which faces the axially inside surface of the tone wheel 14a attached to the hub 7, changes according to changes in the magnetic flux density. The frequency at which the output from this sensor 17a changes is proportional to the rpm of the wheel, and therefore if the output signal from the sensor 17a is input into a controller (not shown in the figures), it is possible to find the rpm of the wheel 10, and it is possible to adequately control the anti-lock brake system (ABS) and traction control system (TCS).

In the bearing unit with speed sensor of the embodiment above the inner ring or race 2a is prevented from turning by the pin 22 which is extended through the axially inside end of the inner race or ring 2a, which supports the sensor 17a, and through the axially outside surface of the holder or knuckle, and therefore, even if the unit is used for long periods of time, the inner race or ring 2a is completely prevented from turning. Also, the sensor 17a supported by the inner ring or race 2 by way of the support ring 15 does not turn, thus preventing the lead wire 18 attached to this sensor 17a from being cut.

The recessed section or hole 21, into which the axially outside half of the pin 22 is pressed, and the another recessed section or receiving hole, into which the axially inside half of this pin 22 is inserted, can be formed easily using a cutting process with a drill press, or a forging process, and therefore increases in manufacturing costs related to manufacturing a rolling-bearing unit with speed sensor that can stop the inner ring or race 2a from turning can be kept low.

Figure 7:
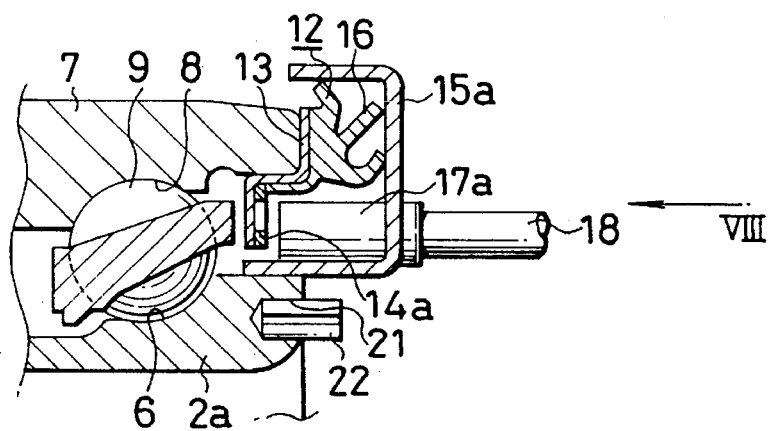
FIG. 7 is a cross sectional showing another embodiment of this invention, and is substantially the same view as in FIG. 6.
Figure 8:
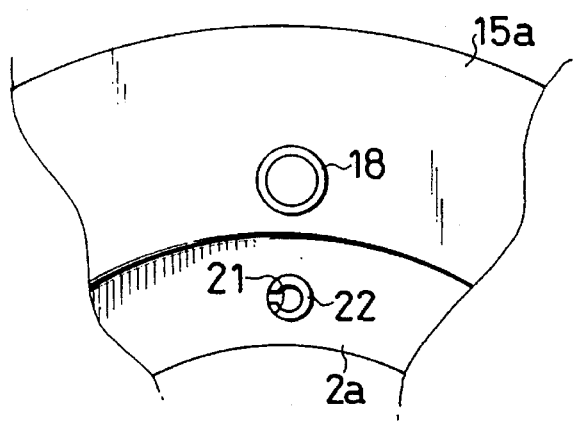
FIG. 8 is a partial side elevational view looking in the direction of arrow VIII of FIG. 7.

Next, FIGS. 7 and 8 show a modification of the first embodiment. While in the first embodiment of this invention, the lead wire 18 that fetches the detection signal from the sensor 17a, is extended from one end in the circumferential direction of the support section 20, however in this embodiment of the invention, the lead wire 18 is extended from the axially inside surface of the support ring 15a. This support ring 15a does not have a support section for supporting the sensor 17a formed by deeply drawing the metal plate as in the first embodiment, but the cross section is the same all away around the ring. Otherwise the construction of this embodiment of the invention is the same as that of the first embodiment.

Figure 9:
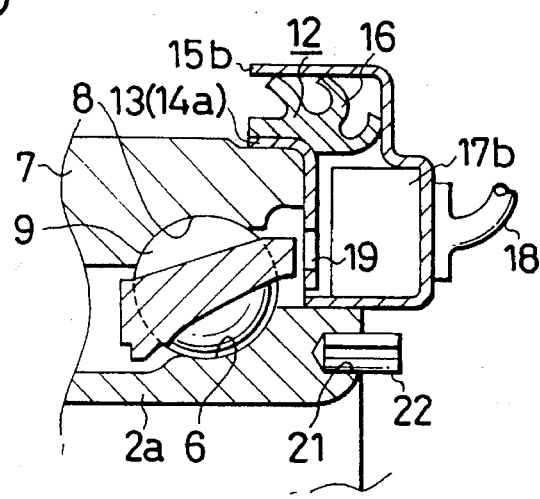
FIG. 9 is a cross sectional view showing another embodiment of this invention, and is substantially the same view as FIG. 6.

FIG. 9 shows also modification a of the first embodiment. In this modification, the core metal ring 13 of the seal ring 12 that is press fitted around the outer circumferential surface of the the hub 7 that functions as the outer ring or race, is bent radically inward toward the wheel axle and in this bent portion, there are several through-holes 19 spaced evenly around the circumference of the ring. In this embodiment, a part of the center metal ring 13 functions as the tone wheel 14a, and so the detection section of the sensor 17b, supported by the support ring 15b, faces the axially inside surface of the section with the holes 19 formed in the core metal ring 13.

Figure 10:
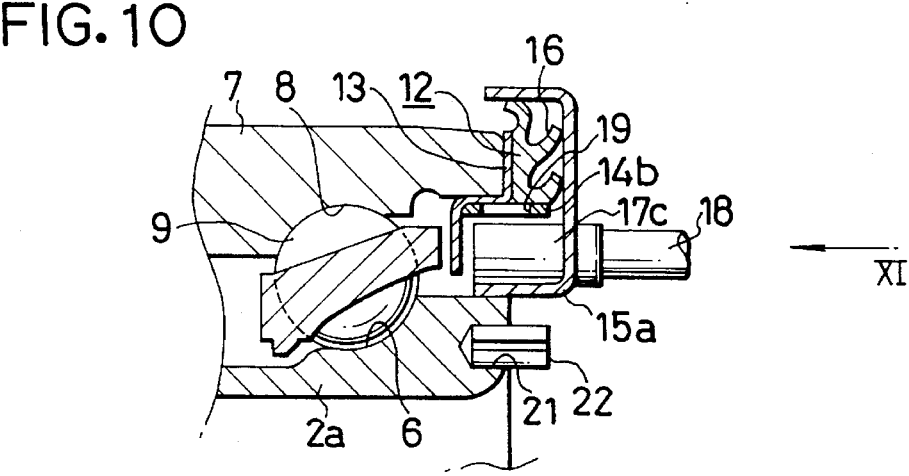
FIG. 10 is a cross sectional view showing another embodiment of this invention, and is substantially the same view as FIG. 6.
Figure 11:
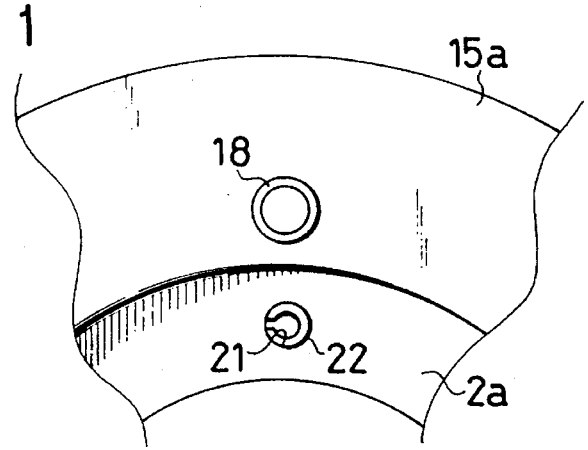
FIG. 11 is a side elevational partial view looking in the direction of arrow XI of FIG. 10.

FIGS. 10 and 11 show another modification of the first embodiment. This modification is different from the embodiments in FIG. 4 to FIG. 9 in that in all of the three embodiments, a ring shaped tone wheel 14a is used, and the detection section of the sensor 17a, 17b faces the axially inside surface of the tone wheel 14a, however in this embodiment, a cylindrical tone wheel 14b is used, and the detection section of the sensor 17c faces the inner circumferential surface of this tone wheel 14b. Otherwise the construction is the same as the three embodiments above.

In these embodiments, the pin 22 with slit is used for preventing relative rotation. Although omitted from the drawings, the pin 22 which prevents the inner ring or race 2a from turning, may be press fitted into a hole formed in a non-rotating member such as the axially outside surface of the holder 4 or axially outside surface of the knuckle, and may be inserted into a receiving hole for receiving this pin formed on the axially inside end of the inner ring or race 2a.

The inner ring or race 2a which must be prevented from turning, supports the sensor 17a (17b, 17c) at a point around its circumference and so the mass is not uniform along its circumference. If the rolling-bearing unit with speed sensor is mounted by holding the hub 7, the inner ring or race 2a turns due to its non-uniform mass. If the position of the pin 22 in relation to the sensor 17a (17b, 17c) is fixed, when the pin 22 has turned to about the same position, the inner ring or race 2a stops. In this condition, if the receiving hole is formed in a position that faces the pin 22, it is easy for the pin 22 to be inserted into the receiving hole.

In the embodiments shown in the drawings, the lead wire 18 for fetching the output signal is constructed so that it extends or in the axial direction, but it is possible to construct it according to need so that it extends in any arbitrary direction. Also, it is possible to perform a burring process to the support ring 15, 15a, 15b in order to construct a cylindrical section from which the lead wire 18 extends in a reinforced manner.

Figure 12:
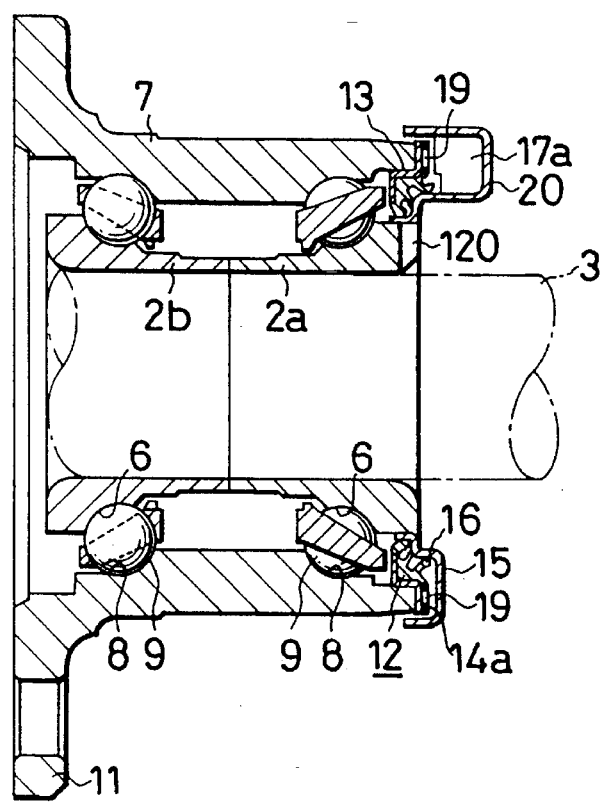
FIG. 12 is a cross sectional view showing another embodiment of this invention, taken along the line XII—XII of FIG. 13.
Figure 13:
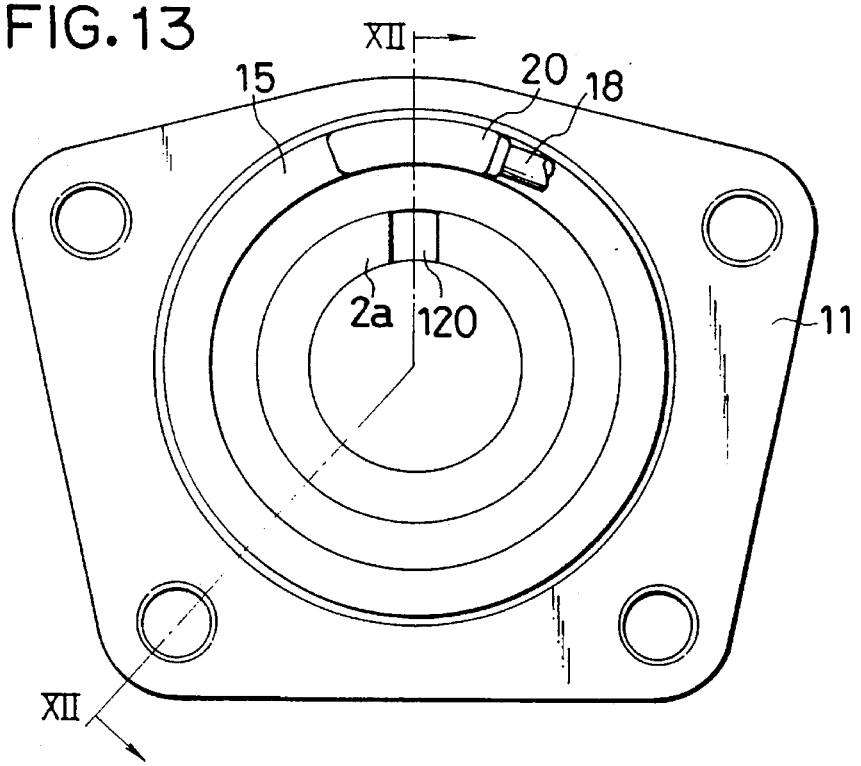
FIG. 13 is a right side elevational view of FIG. 12.

FIG. 12 and FIG. 13 show another embodiment of the present invention.

In this embodiment, the inner ring or race 2a is formed with a radial notch or groove 120 at its axially inside end, while the wheel axle 3 is formed with a projected portion (not shown) at the position corresponding to the notch or groove 120.

The wheel axle 3 can be formed with a notch or groove instead of the projected portion above, so that a key member is inserted through these notches or grooves for preventing relative rotation.

Figure 14:
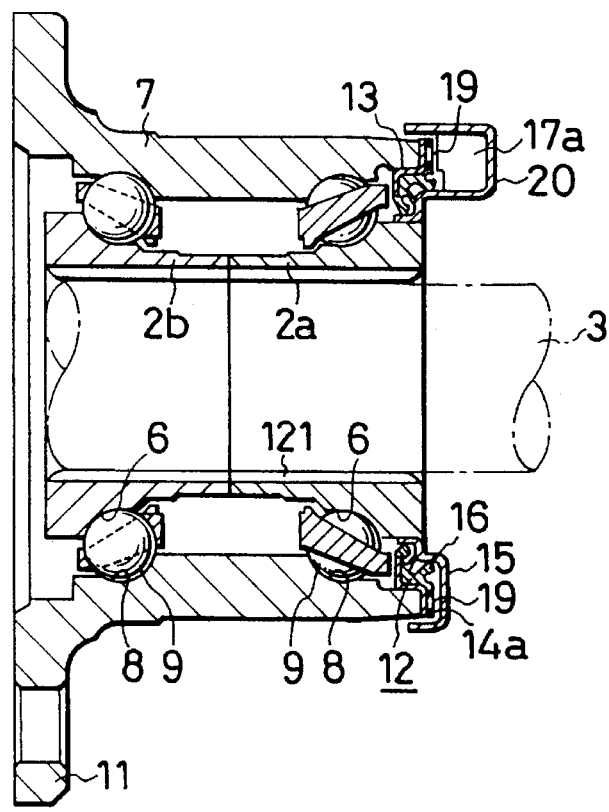
FIG. 14 is a cross sectional view showing another embodiment, taken along the line XIV—XIV of FIG. 15.
Figure 15:
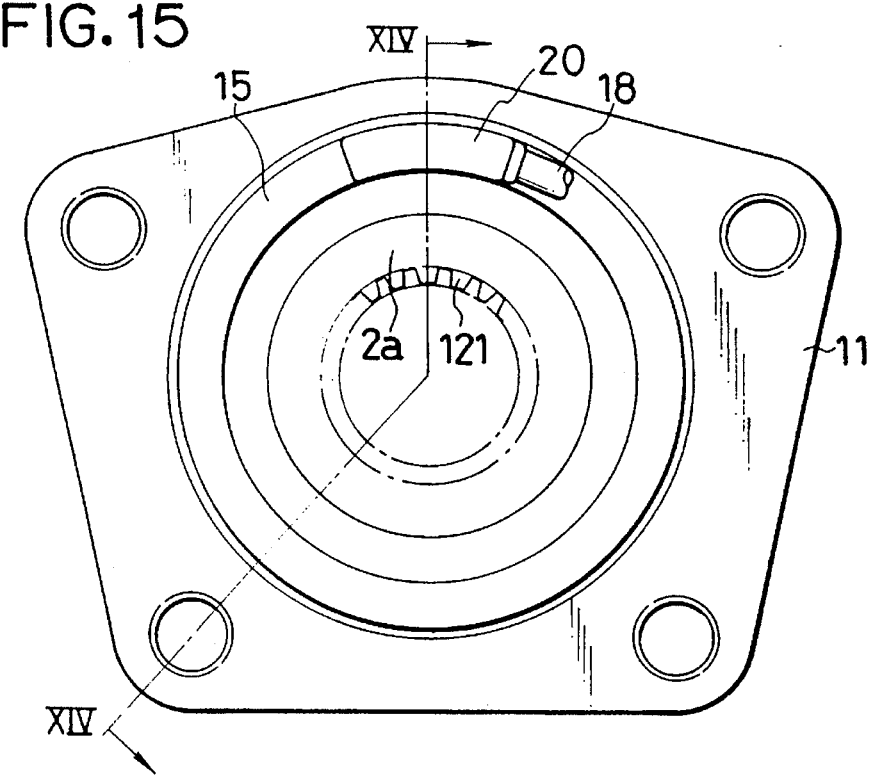
FIG. 15 is a right side elevational view of FIG. 14.

FIG. 14 and FIG. 15 show another embodiment of this invention.

In this embodiment, a spline engagement 121 is provided between the inner rings or races 2a and 2b and the wheel axle 3.

Figure 16:
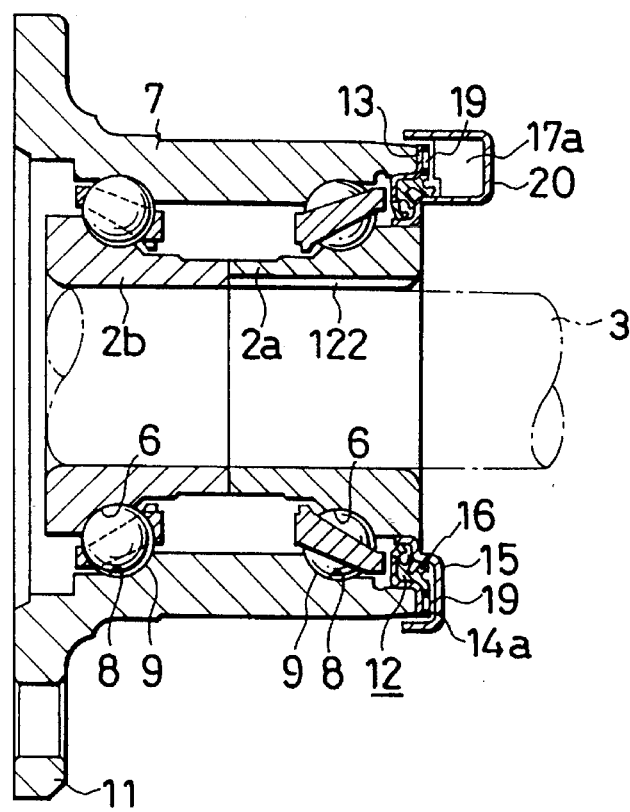
FIG. 16 is a cross sectional view showing another embodiment, taken along the line XVI—XVI of FIG. 17.
Figure 17:
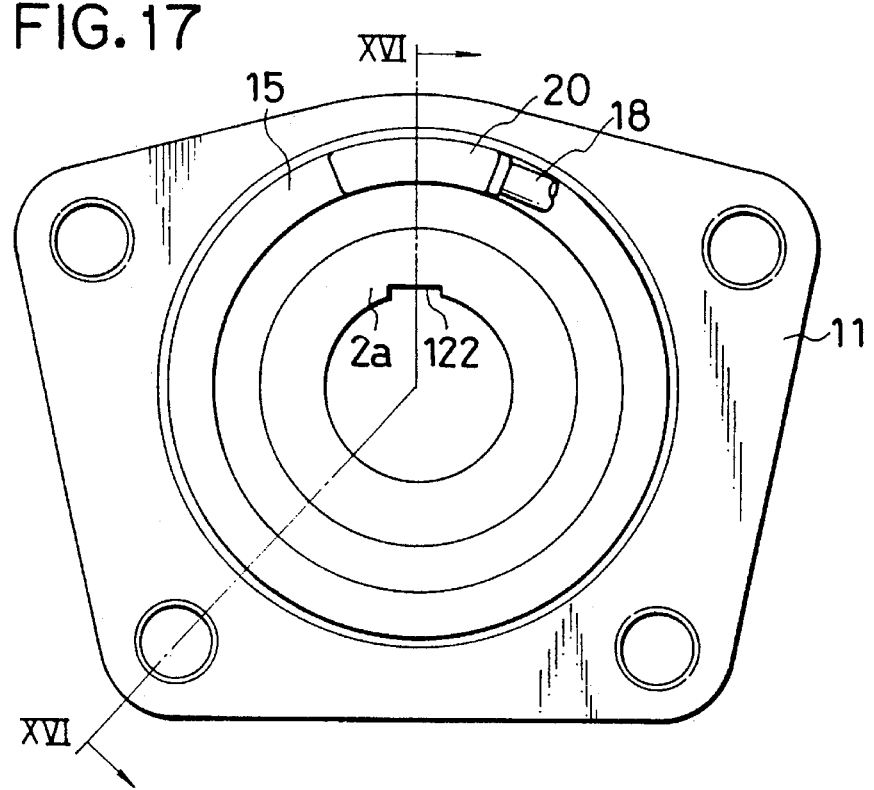
FIG. 17 is a right side elevational of FIG. 16.

FIG. 16 and FIG. 17 show another embodiment of this invention.

In this invention, the inner ring or race 2a is formed with a key groove 122 axially extending on its inner circumferential surface. The wheel axle 3 is also formed with a corresponding key groove (not shown), and a key member (not shown) is inserted in the key grooves.

Figure 18:
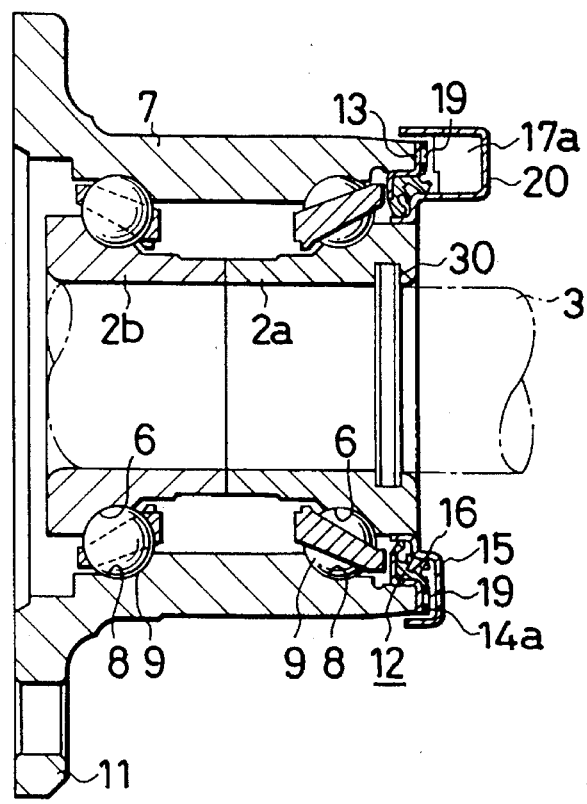
FIG. 18 is a cross sectional view showing another embodiment of this invention, taken along the line XVIII—XVIII of FIG. 19.
Figure 19:
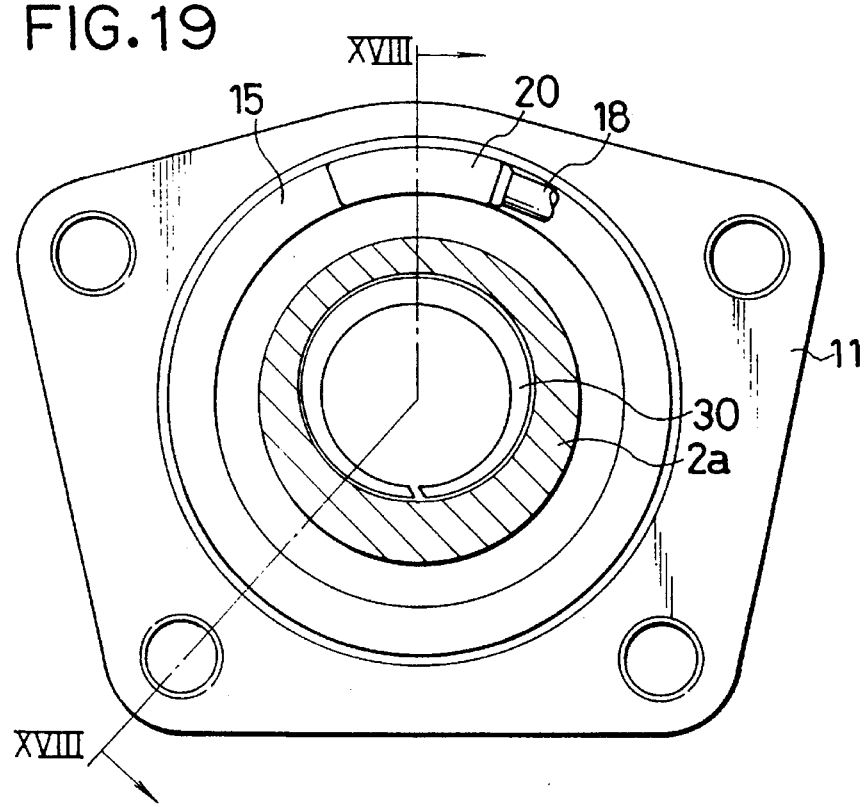
FIG. 19 is a right eleventional view of FIG. 18.

FIG. 18 and FIG. 19 show another embodiment of this invention.

In this embodiment, the axially inside section of the stationary inner ring or race 2a is formed with an eccentric circumferential groove into which a collar 30 is inserted. The collar 30 has inner and outer peripheries eccentric with respect to each other, so that if the inner ring or race 2a is moved relative to the wheel axle 3, the collar 30 is wedged between the wheel axle 3 and the inner ring or race 2a to prevent the relative rotation between them.

In this embodiment, if the hub or outer ring 7 is stationary, the hub or outer ring 7 is formed with an ecceetric groove on its outer periphery into which a collar can be inserted.

Figure 20:
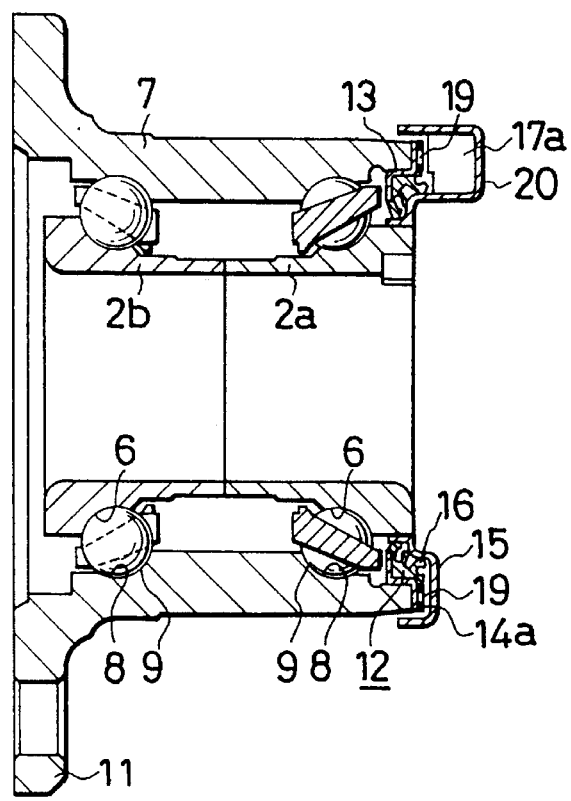
FIG. 20 is a cross sectional view showing another embodiment of this invention, taken along the line IXX—IXX of FIG. 21.
Figure 21:
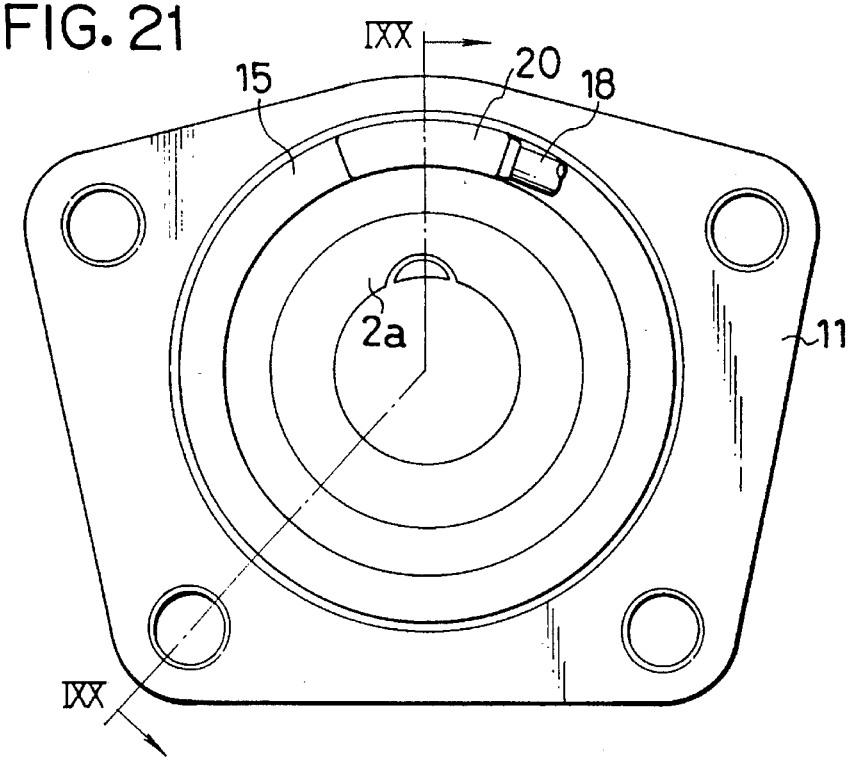
FIG. 21 is a right elevational view of FIG. 20.

FIG. 20 and FIG. 21 show another embodiment of this imvention. The stationary inner ring or race 2a is formed with a recessed section or groove in a crescent shape on its inner circumferential surface, and a corresponding collar is inserted into the crescent groove for preventing relative rotation.

The crescent engagement is designed so that the wedge angle, when the inner ring or race 2a is rotated, is equal to or less than the friction angle ($=\tan^{-1}\mu$).

If the outer ring or hub 7 is stationary, a crescent groove is formed on the outer periphery of the outer ring or hub 7 for inserting a collar into it.

Figure 22:
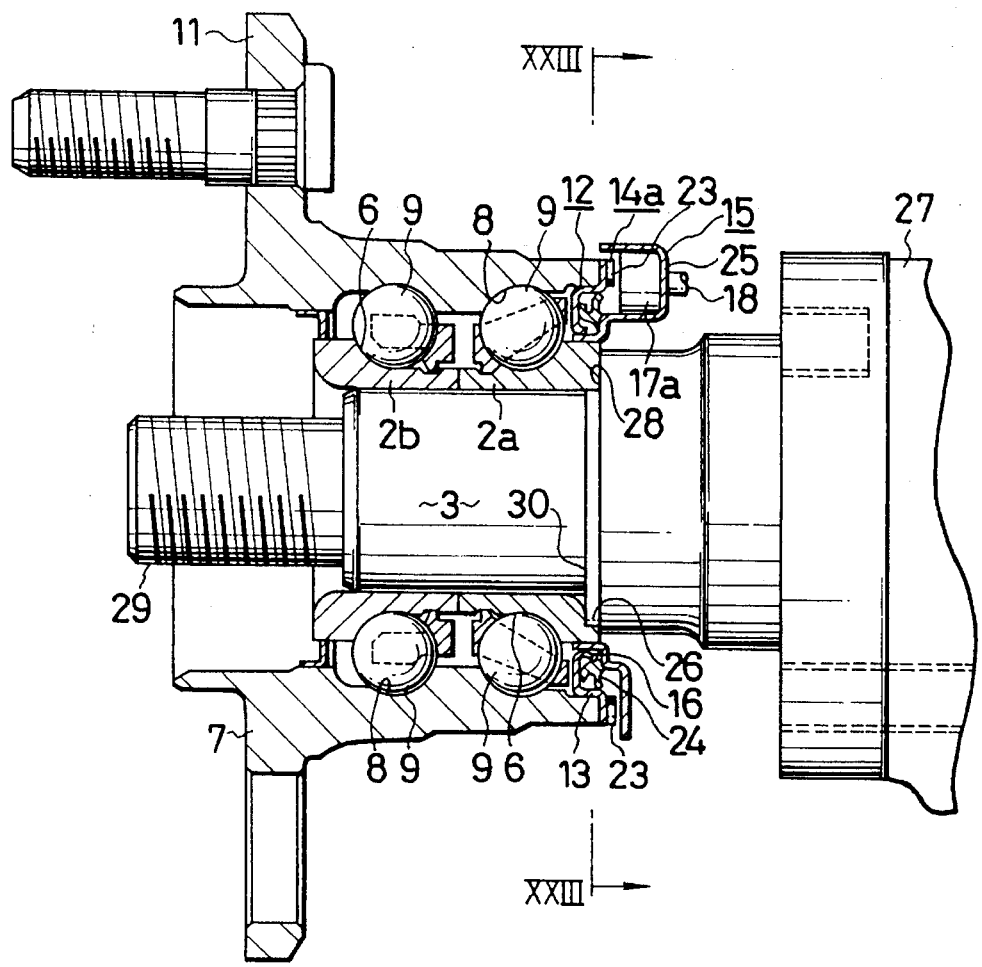
FIG. 22 is a cross sectional view showing another embodiment of this invention.
Figure 23:
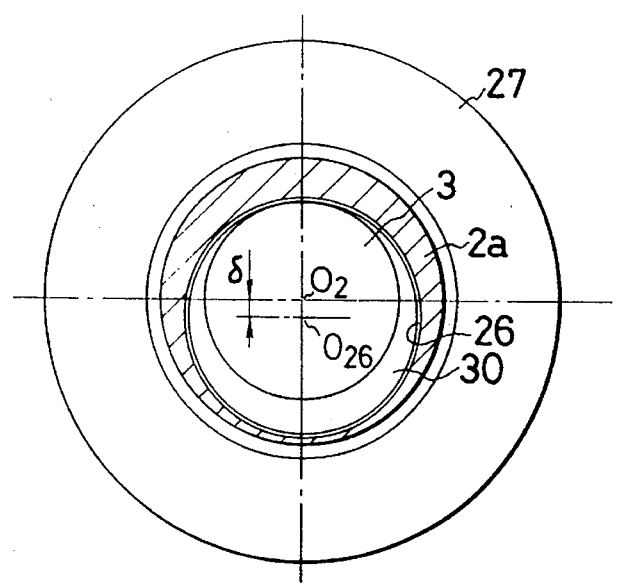
FIG. 23 is a view taken along the line XXIII—XXIII of FIG. 22.

FIG. 22 and FIG. 23 show another embodiment of this invention.

A pair of inner rings or races 2a and 2b are fitted onto the shaft member or specifically wheel axle 3 and formed with an inner ring raceway 6 on their outer cercumferential surfaces, respectively.

Specifically, the wheel axle 3 is formed with a stepped portion 28 along its outer circumferential surface at its mid section, while the axially inside inner ring or race 2a is formed with an inner end face which is abutted to the stepped portion 28.

The wheel axle 3 is formed with a male-threaded portion 29 axially outward (left side in FIG. 22) from the axially outer inner ring or race 2b, and a nut (not illustrated) is screwed onto the threaded portion 29 so as to prevent the pair of inner rings or races 2a and 2b from being pulled out of the wheel axle 3.

The wheel axle 3 is also formed with a knuckle spindle 27 at its axially inner (right side in FIG. 22) end. In addition, a hub 7 operating as an outer ring is provided around and concentrical with the inner rings or races 2a and 2b.

A plurality of balls 9 are placed between the outer ring raceways 8 on the inner circumferential surface of the hub 7 and each of the inner ring raceways 6 to rotatably support the hub 7 around the inners ring or races 2a and 2b.

There is a flange 11 formed on the outer circumferential surface of the hub 7, and the wheel 10 (see FIG. 1) is fastened to the flange 11. Also, there is a seal ring 12 having a core metal ring 13 fastened inside the opening of the axially inside end of the hub 7. Moreover, there is a tone wheel 14a attached to the axially inside surface of this core metal ring 13. This tone wheel 14a is made entirely of magnetic material that is formed into an annular shape, and therefore by forming several notches 23 having equal pitch around its circumference, the magnetic properties alternate around the circumference.

There is a support ring 15, formed by drawing from a metal plate, that is fastened in a fitting relationship onto the axially inside end of the axially inside inner ring or race 2a. The seal ring 12 is formed with a seal material 16 the edge of which comes in sliding contact with the outer circumferential surface of this support ring 15. The support ring 15 is provided with a seal material 24 the edge section of which comes in sliding contact with the outer circumferential surface and axially inner surface of the core metal ring 13. Thus, the seal materials 16 and 24 prevent dust and rain water from getting into the area where the balls 9 are located.

Moreover, there is a support section 25 formed in a portion of the support ring 15 by deeply drawing the metal plate. A sensor 17a is supported in this support section 25, and the detection section of this sensor 17a faces the axially inside surface of the tone wheel 14a. The lead wire 18 used to fetch the detection signal from the sensor 17a, extends from the axially inside face of the support section 25.

The inner ring or race 2a is provided with a circular concave section 26 or recessed section at its axially inside opening along its inner circumferential surface. The center $O_{26}$ of the concave section 26 is eccecntric by $\delta$ with reference to the centor $O_2$ of the inner ring or race 2a and the wheel axle 3 as shown in FIG. 23. Accordingly, the substantial part of the inner circumferential surface of the concave section 26 is eccentric with reference to the cylindrical surface having its center on the center axis of the inner ring or race 2a.

The wheel axle 3 is provided with a convex section or projected section 30 at the axially outside face of the stepped section 28 formed on the cicumferential surface, so that the convex section 30 is fitted into the concave section 26.

The convex section 30 has its center eccentric by $\delta$ with reference to the center $O_2$ of the wheel axle 3 and the inner ring or race 2a, similar to the center $O_{26}$ of the concave section 26. The substantial part of the convex section 30 is eccentric with reference to the cylindrical surface having its center on the center axis of the wheel axle 3.

When the rolling-bearing unit with speed sensor described above is in use, the wheel 10 of the axle 3 is fastened to the flange 11 formed on the outer circumferential surface of the hub 7. In this condition, the wheel is supported so that it is able to turn freely with respect to the wheel axle 3. At the same time, concave section 26 is fitted into the convex section 30. As a result, the wheel axle 3 is coupled with the inner ring or race 2a which supports the sensor 17a by way of the support ring 15, so that relative rotation between the inner ring or race 2a and the wheel axle 3 is impossible.

In the case where the bearing unit with speed sensor of this embodiment is installed between the wheel axle 3 and the wheel 10, and as the hub 7 rotates with the rotation of the wheel, the voltage output from the sensor 17a, which faces the side surface of the tone wheel 14a attached to the hub 7, changes according to changes in the magnetic flux density. The frequency at which the output from this sensor 17a changes is proportional to the rpm of the wheel, and therefore if the output signal from the sensor 17a is input into a controller (not shown in the figures), it is possible to find the rpm of the wheel, and it is possible to adequately control the anti-lock brake system (ABS) and traction control system (TCS).

In the rolling-bearing unit with speed sensor of the embodiments above, the inner ring or race 2 is prevented from turning by the fitting relationship between the concave section 26 on the inner circumferential surface of the inner race or ring 2a, which supports the sensor 17a, and the convex section 30 on the outer circumferential surface of the wheel axle 3, and therefore, even if the unit is used for long periods of time, the inner race or ring 2a is completely prevented from turning. Also, the sensor 17a supported by the inner race by way of the support ring 15 does not turn, thus preventing the lead wire 18 attached to this sensor 17a from being cut.

Since the fitting relationship between the concave section 26 and the convex section 30 does not require precision in a high degree, the operation to form the concave section 26 and the convex section 30 can be formed easily using a forgoing process, and therefore increases in manufacturing costs related to manufacturing a rolling-bearing unit with speed sensor that can stop the inner ring or race 2a from turning can be kept low.

Figure 24:
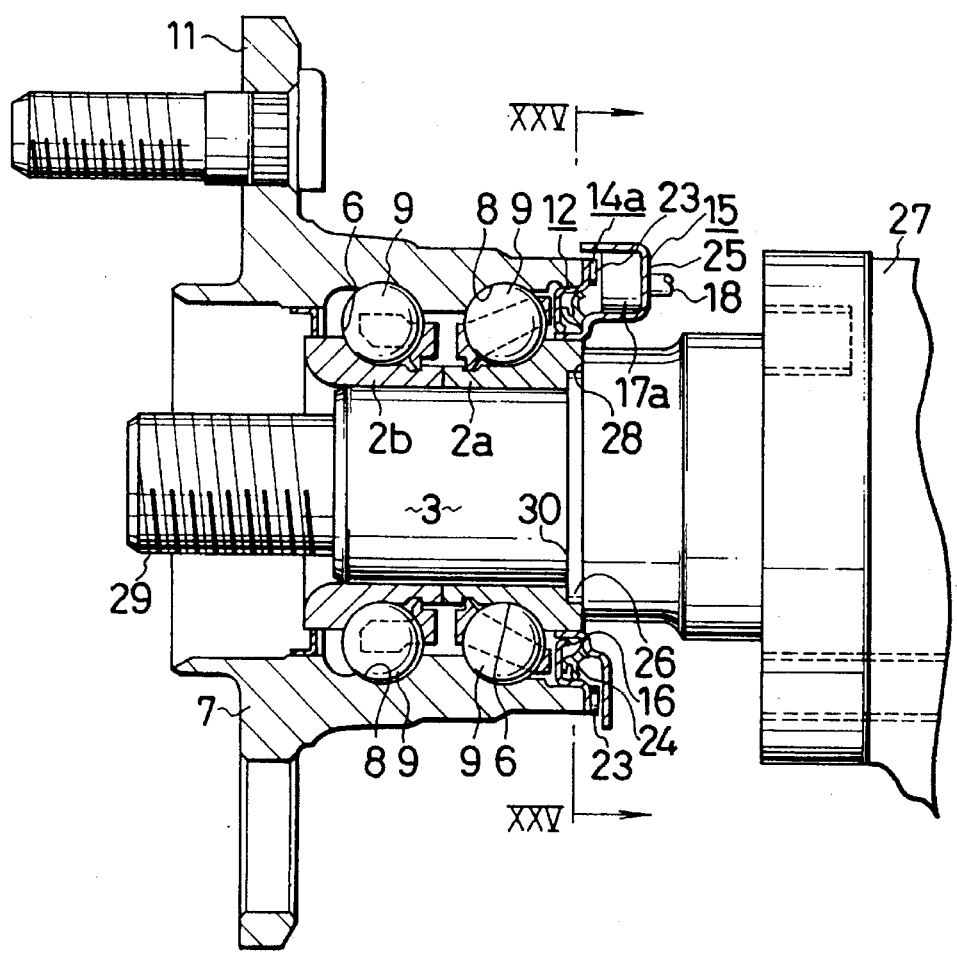
FIG. 24 is a cross sectional view showing another embodiment of this invention.
Figure 25:
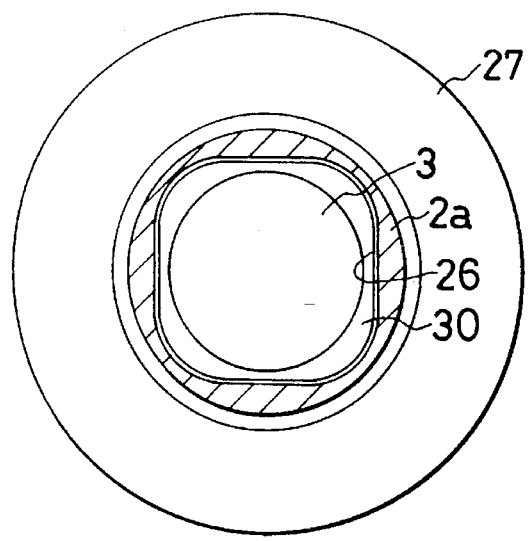
FIG. 25 is a cross sectional view taken along the line XXV—XXV of FIG. 24.

FIG. 24 and FIG. 25 show a modification of the embodiment of FIG. 24. While in the embodiment of FIG. 24, the concave section 26 and the convex section 30 are formed in a circle eccentric with respect to the wheel axle 3 and the inner rings or races, however, in this modification, the concave section 26 and the convex section 30 are formed square with its corners shaped round. The other portions of construction and their functions are substationally the same as those of the previous embodiments.

Figure 26:
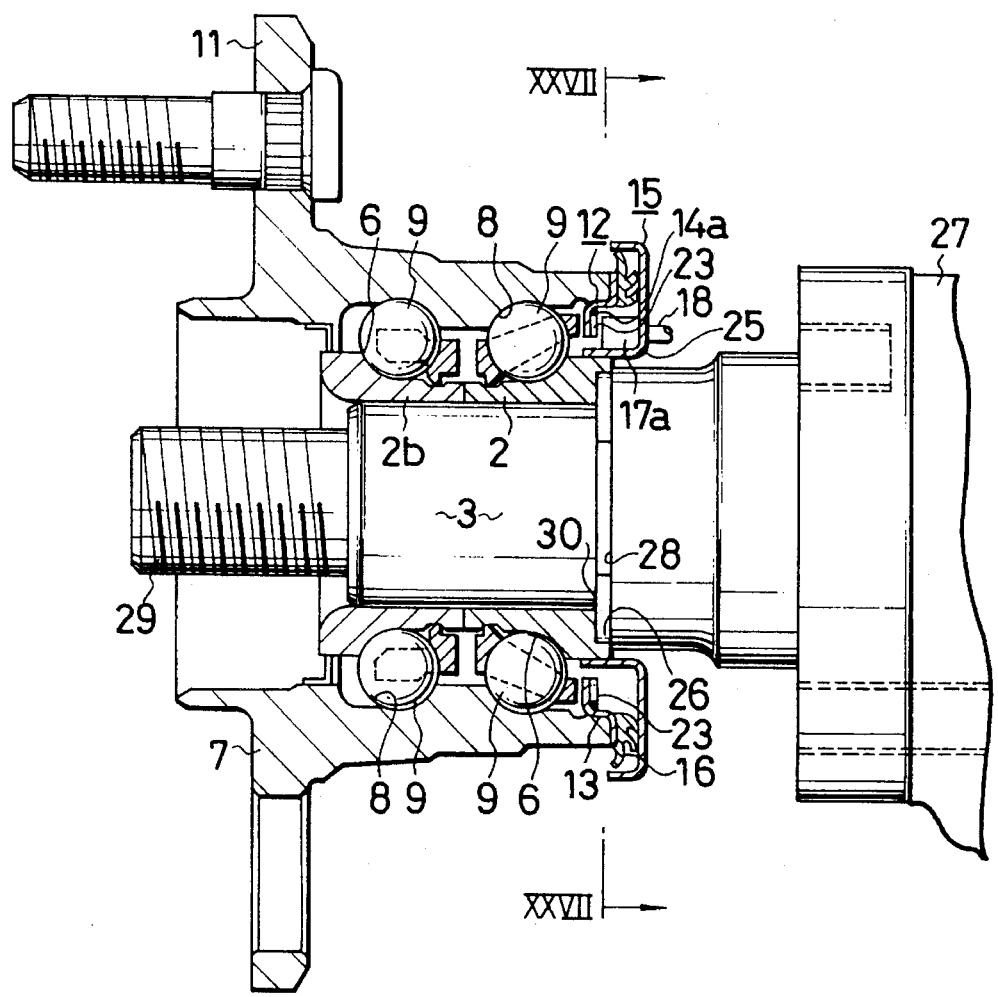
FIG. 26 is a cross sectional view showing another embodiment of this invention.
Figure 27:
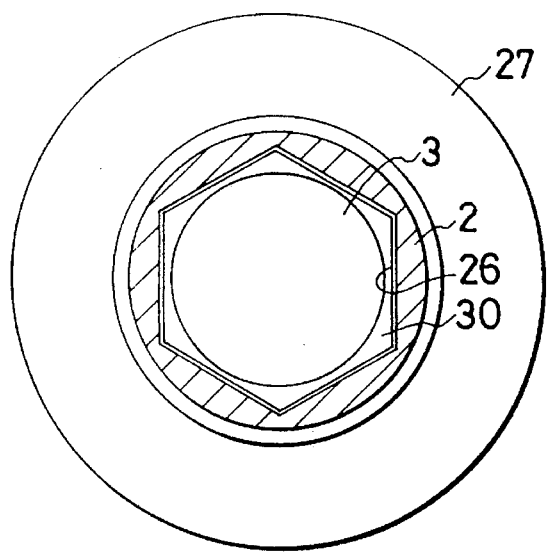
FIG. 27 is a cross sectional view taken along the line XXVII—XXVII of FIG. 26.

The concave section 26 and the convex section 30 can be formed in a different polygonal e.g. hexagonal shape as shown in FIG. 26 and FIG. 27.

FIG. 26 and FIG. 27, the tone wheel 14a is supported by the core metal member 13 of the seal ring 12 at its inner peripheral portion.

A seal member 16 is supported by the core metal member at its outer peripheral portion and abutted to the support ring 15.

Figure 28:
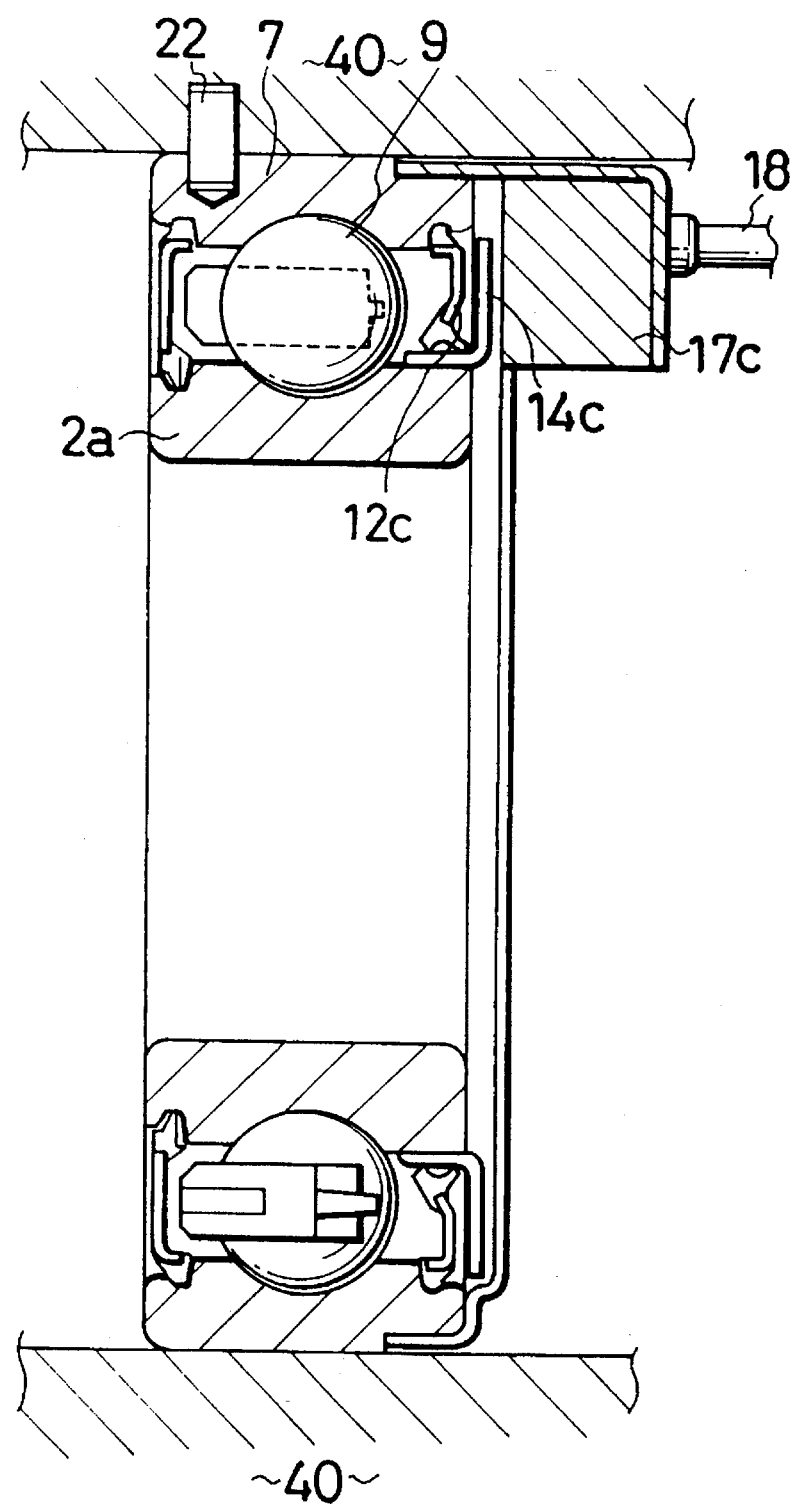
FIG. 28 is a cross sectional view showing another embodiment of this invention.

FIG. 28 shows another embodiment of this invention.

In this embodiment, the outer ring or race 7 is stationary, while the inner ring or race 2a is rotatable. The anti-creep pin 22 in a substatially cylindrical shape for preventing relative rotation has a radially inside half inserted on the outer peripheral section of the outer ring or race 7, and the radially outside half is projected from the outer circumferential surface of the outer ring 7. There is a housing 40 around the outer ring or race 7, and a receiving groove is formed in the inner circumferential surface of the housing 40 so that the radially outside half of the pin 22 is inserted into the receiving groove of the housing. An active sensor 17c with lead wire 18 and a tone wheel 14c are provided so as to axially face each other. The tone wheel 14c is fitted around the rotatable inner ring or race 2a, while the stationary outer ring or race 7 is provided with a seal means 12c to seal the gap between the outer ring or race 7 and the inner ring or race 2a having the tone wheel 14c.

Figure 29:
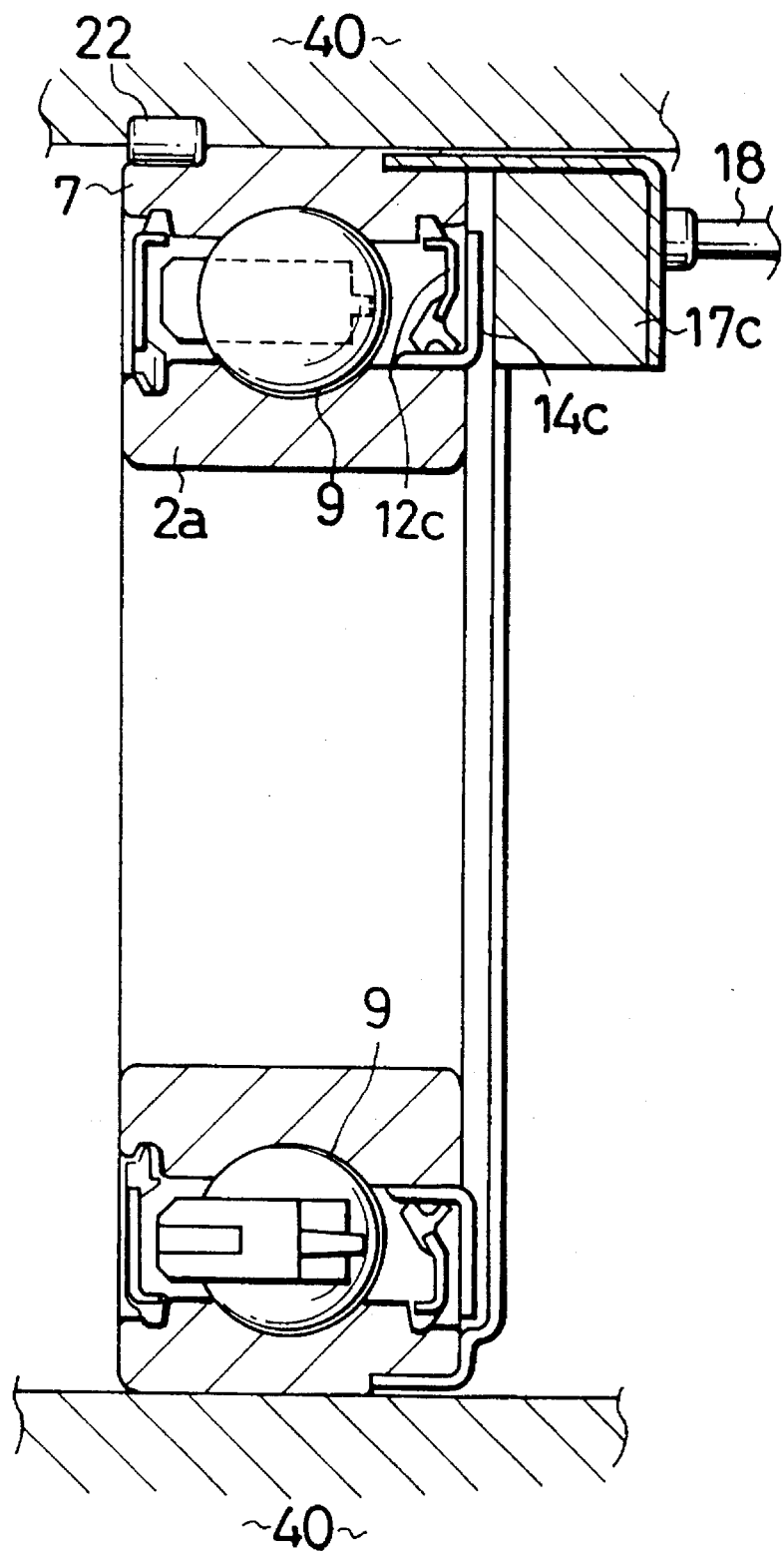
FIG. 29 is a cross sectional view showing another embodiment of this invention.
Figure 30:
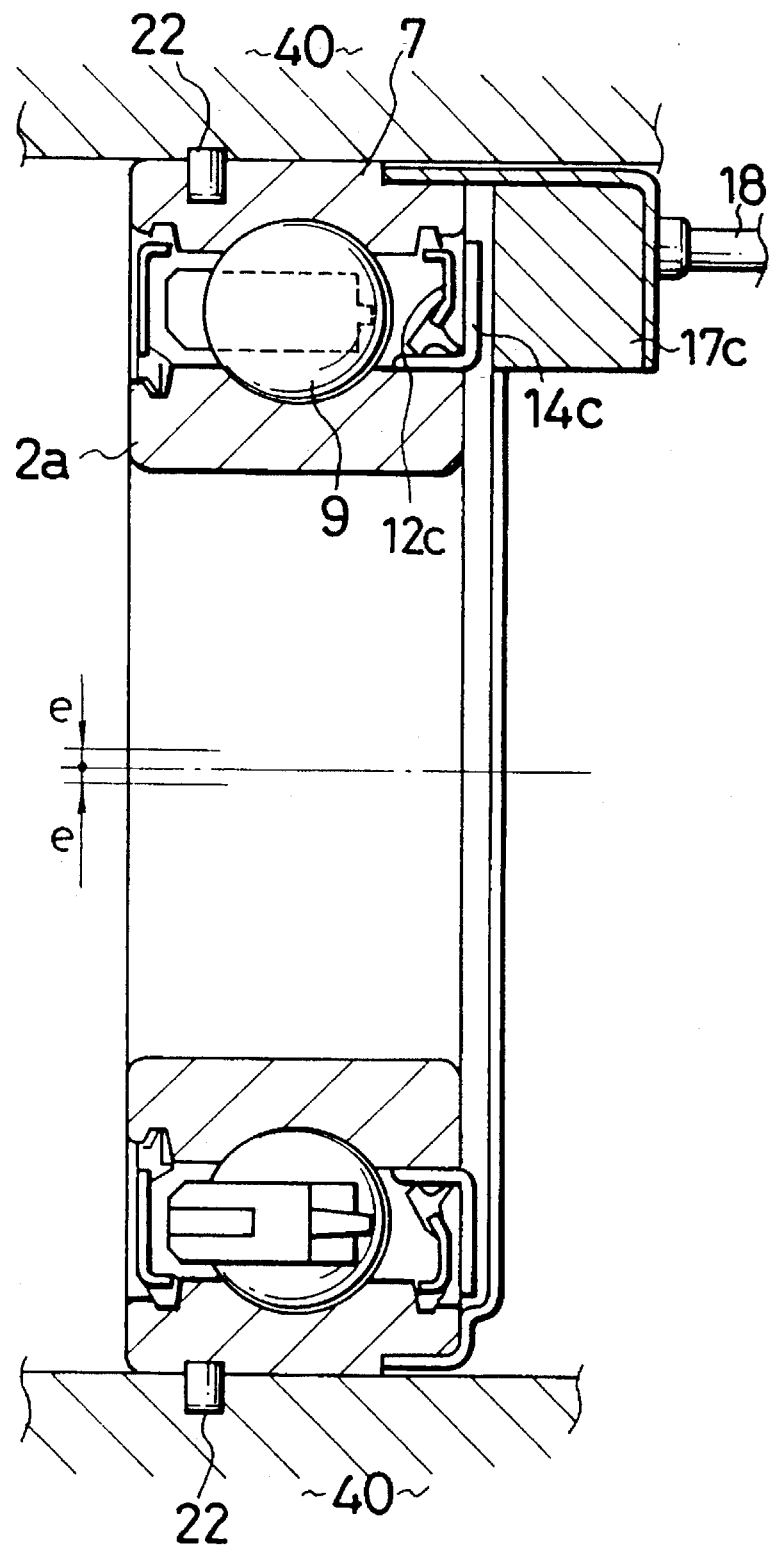
FIG. 30 is a cross sectional view showing another embodiment of this invention.

FIG. 29 and FIG. 30 show modifications of the embodiment of FIG. 28.

In FIG. 29, the substantially cylindrical, anti-creep pin 22 has its axis in the axial direction of the bearing. Other components are substantially the same as those of FIG. 28.

In FIG. 30, the housing 40 comprises two halves around the bearing axis, and has an eccentric groove with eccentricity e on the inner circumferential surface. On the other hand, the outer ring 7 has an eccentric groove on the outer circumferential surface which is equal to the eccentric groove of the housing 40 in eccentricity e. Mounted to the eccentric groove of the outer ring 7 before assembling the two-halves of the housing 40 is a C-shaped wedge member which has concentric inner and outer circumferential surfaces. In this construction, if the outer ring 7 is subjected to creeping, the C-shaped wedge member is a bar against the creeping.

Figure 31:
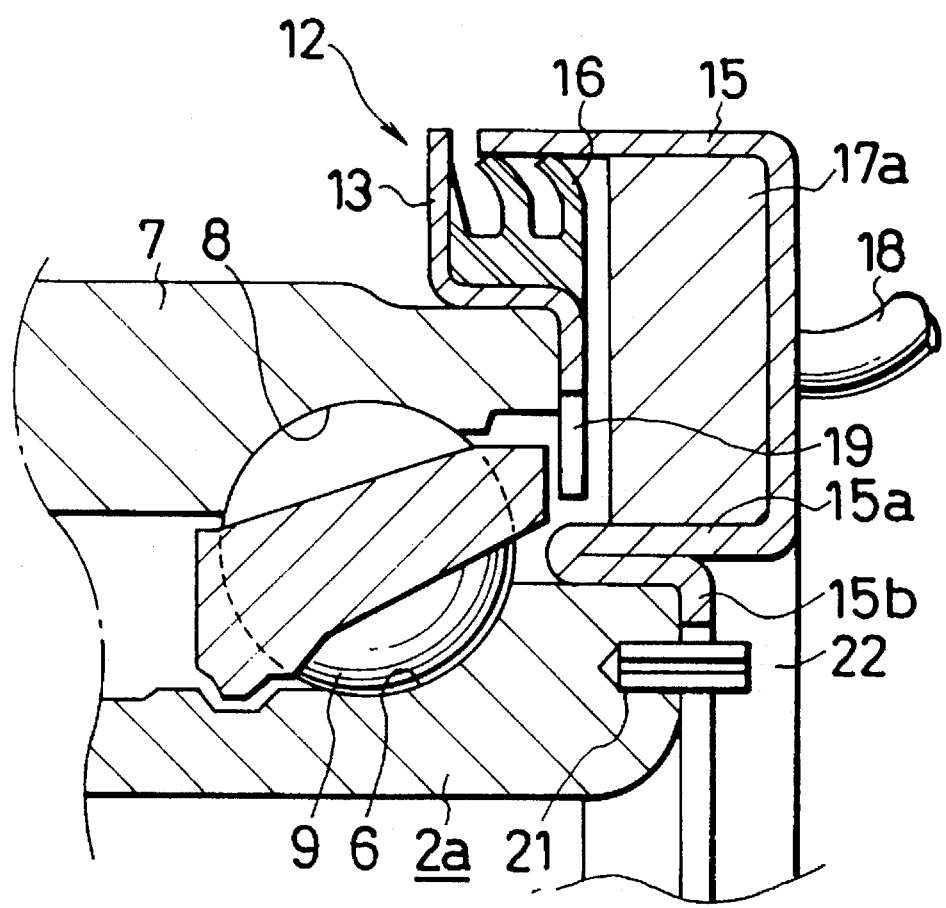
FIG. 31 is a cross sectional view showing another embodiment of this invention, and substantially the same view as FIG. 6.

FIG. 31 shows another embodiment of this invention, which has a seal structure corresponding to FIG. 6.

In this embodiment, a seal means 12 comprising a core metal member 13 with through-holes 19 is fitted around the axially inside end section of the outer ring or hub 7, while a support ring 15 is fitted around the axially inside end section of the inner ring or race 2a to accommodate a sensor 17a in a recessed section formed by the support ring 15. In addition, the seal member 16 is mounted to the core metal member 13 and has its edges in sealing contact with the support ring 15.

The pin 22 is inserted into the axially inside end section of the inner ring or race 2a and projected from it so as to be inserted into a stationary member 4 as shown in FIG. 1. The stopper means for preventing the sensor 17a from rotating is comprised of the pin 22 in a similar manner as the embodiment of FIG. 4.

Figure 32:
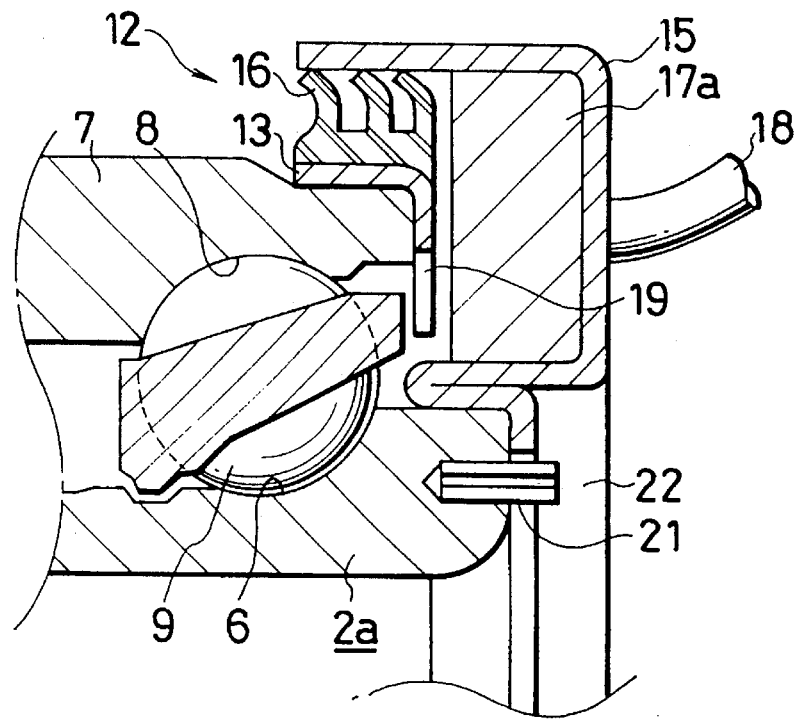
FIG. 32 is a cross sectional view showing another embodiment of this invention, and substantially the same view as FIG. 6.
Figure 33:
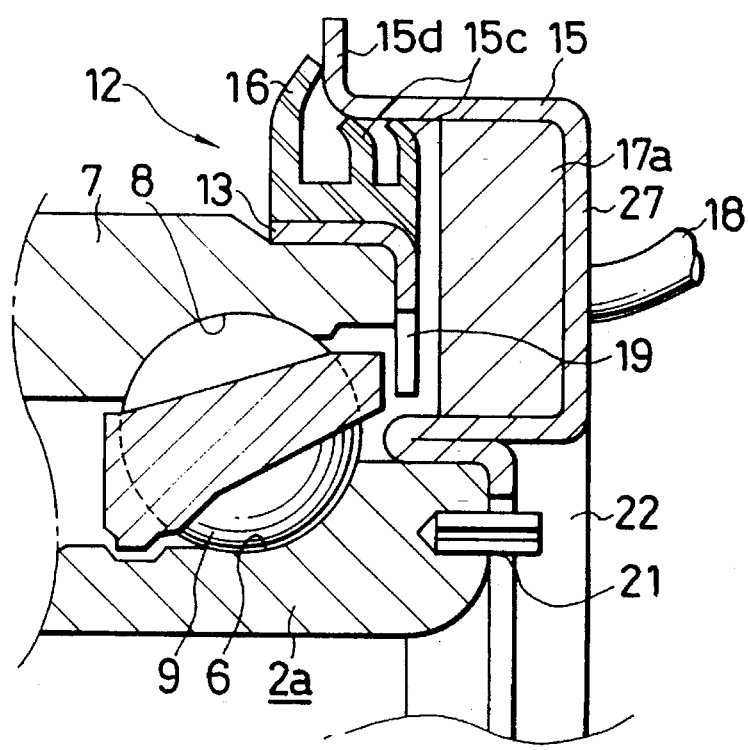
FIG. 33 is a cross sectional view showing another embodiment of this invention, and substantially the same view as FIG. 6.

FIG. 32 and FIG. 33 show modifications of the embodiment of FIG. 31, specifically in the seal structure. The stopper means for preventing the sensor 17a from rotating has the pin 22 as in the embodiments of FIG. 31 and FIG. 4.

In the embodiments of FIG. 31 to FIG. 33, the support ring 15 has a folded portion 15a for engagement with the inner ring or race 2a. Specifically, the folded portion 15a is axially projected and folded back to be fitted onto the axially inside end of the inner ring or race 2a. In addition, the support ring 15 is formed with a stopper flange 15b at its radially central section. Specifically, the stopper flange 15b is extended radially inward from the radially inner end of the folded portion 15a so that the axially inside end of the inner ring or race 2a is abutted along its peripheral edge to the axially outside face of the stopper flange 15b. The stopper flange 15b has an opening through which the pin 22 is projected.

With the construction above, the relative position of the suport ring 15 to the inner ring or race 2a is securely kept even in transporting. Specifically, even if the supprot ring is shocked by any outside article or material in transporting, the support ring 15 is never displaced with reference to the inner race on ring 2a.

In FIG. 31 to FIG. 33, the supprot ring 15 has an outer cylindrical portion 15c with which the seal lips of the seal member 16 come into contact.

In FIG. 33, the supprot ring 15 has an outside flange portion 15b, and the seal lips of the seal member 16 come into contact with the cylindrical portion 15c and the flange portion 15d.

We claim:

1. A bearing unit for a wheel with a speed sensor, comprising:

an inner ring and an outer ring;

a stationary member;

a stationary race formed by said inner ring and being supported by the stationary member in a fitting relationship with the stationary member, and having a speed sensor mounted thereon, said speed sensor having a speed signal transmission wire connected thereto;

a rotating race formed by said outer ring and having a rotary encoder formed by a tone wheel;

a plurality of rolling members provided between the stationary race and the rotating race;

a supporting member having a portion for supporting said speed sensor and being fastened to said inner ring; and interengaging means provided in the vicinity of said portion of said supporting member between the stationary member and the stationary race and including first means provided on said stationary member and second means provided on said stationary race and being in a mating relationship with said first means so as to totally prevent the stationary race from being displaced with respect to the stationary member, so that the speed signal transmission wire of said speed sensor is prevented from being cut due to tension.

2. The bearing unit of claim 1, wherein said stationary race has a projected section while the stationary member has a recessed section in a mating relationship with the projected section to form the second means and the first means of the interengaging means, respectively.

3. The bearing unit of claim 1, wherein said stationary race has a first recessed face while the stationary member has a second face configured to be in mating relationship with the first face to form said second means and said first means, respectively, and the interengaging means further includes a engaging member provided between the first face and the second face.

4. The bearing unit of claim 1, wherein said stationary race has a first circular mating face and the stationary member has a second circular mating face positioned in an eccentric circular mating relationship with the first mating face to form said second means and said first means of said interengaging means, respectively.

5. The bearing unit of claim 1, wherein said stationary race has a first non-circular mating face, and the stationary member has a second non-circular mating face positioned in a non-circular mating relationship with the first mating face to form said second means and said first means of said interengaging means, respectively.

6. The bearing unit of claim 1, wherein said stationary race and said stationary member have first and second faces in a mating relationship, one of the first and second faces having an eccentric circular section, the other of the first and second faces having a concentric circular section, and an eccentric wedge ring is provided between the first and second faces to form said interengaging means.

7. The bearing unit of claim 1, wherein said stationary race and said stationary member have first and second faces in a mating relationship, one of the first and second faces having a concave face, the other of the first and second faces having a plane face, so that the first and second faces are mated to have a wedge angle, and a wedge is placed between the concave face and the plane face to provide a friction angle in correspondence with the wedge angle, thereby forming said interengaging means.

8. The bearing unit of claim 1, wherein said stationary race has a convex section and said stationary member has a concave section in a mating relationship with the concave section to form said second means and said first means of said interengaging means, respectively.

9. The bearing unit of claim 1, wherein said stationary race has a first concave face and said stationary member has a second concave face in mating relationship with the first face, and said interengaging means further includes an engaging member provided between the first face and the second face.

* * * * *